US009771921B2

(12) United States Patent
Ghouse

(10) Patent No.: US 9,771,921 B2
(45) Date of Patent: Sep. 26, 2017

(54) FREE FLOATING WAVE ENERGY CONVERTER WITH CONTROL DEVICES

(76) Inventor: Syed Mohammed Ghouse, Hyderabad (IN)

( * ) Notice: Subject to any disclaimer, the term of this patent is extended or adjusted under 35 U.S.C. 154(b) by 785 days.

(21) Appl. No.: 14/233,767

(22) PCT Filed: Jul. 20, 2012

(86) PCT No.: PCT/IN2012/000510
§ 371 (c)(1),
(2), (4) Date: Jan. 20, 2014

(87) PCT Pub. No.: WO2013/014682
PCT Pub. Date: Jan. 31, 2013

(65) Prior Publication Data
US 2014/0157767 A1    Jun. 12, 2014

(30) Foreign Application Priority Data
Jul. 22, 2011  (IN) .......................... 2511/CHE/2011

(51) Int. Cl.
F03B 13/18    (2006.01)
F03B 13/24    (2006.01)

(52) U.S. Cl.
CPC ............ *F03B 13/18* (2013.01); *F03B 13/188* (2013.01); *F03B 13/1815* (2013.01);
(Continued)

(58) Field of Classification Search
CPC .... F03B 13/188; F03B 13/1815; F03B 13/24; F03B 13/18; F03B 13/142; F05B 2250/184; F05B 2240/93; Y02E 10/38; Y02E 10/32
(Continued)

(56) References Cited
U.S. PATENT DOCUMENTS 3,335,667 A    8/1967  Murphy
4,125,346 A    11/1978 Pickle
(Continued)

FOREIGN PATENT DOCUMENTS

GB    2024957 A    1/1980
JP    54-155334 A   12/1979
(Continued)

OTHER PUBLICATIONS

Database WPI: Section PQ, Week 198526; Derwent Publications Ltd., London, GB; Class Q55, AN 1985-158007; XP002372600 "Wave Power Installation Guide—Has Ballast Tank at Start Section of Pipe and Uniformly Positioned Check Valves Over Pipe Length to Increase Pressure Head".
(Continued)

*Primary Examiner* — Phutthiwat Wongwian
*Assistant Examiner* — Kelsey Stanek
(74) *Attorney, Agent, or Firm* — Shumaker Loop & Kendrick; William J. Clemens

(57) ABSTRACT

A free floating wave energy converter includes a flexible pine and an inlet. The flexible pipe floats on water surface, following the wave form. Slugs of water and air enter, one after the other, through the inlet. Because the flexible pipe follows the shape of the wave, water is transported through a manifold to a pressure chamber connected to a generator. The inlet consists of hollow, inflexible pipe attached to the throat of the flexible pipe. The inflexible pipe is fixedly attached to a buoyancy tank or plurality thereof. The buoyancy tanks are arranged in a vertical plane or in tandem, with the inflexible pipe passing along the plane vertical to the fore and aft axis of the buoyancy tank and the frontward portion projecting sufficiently ahead of the buoyancy tank with the flexible pipe terminating at a singular outlet.

15 Claims, 14 Drawing Sheets

(52) U.S. Cl.
CPC ........ *F03B 13/24* (2013.01); *F05B 2250/184* (2013.01); *Y02E 10/38* (2013.01)

(58) Field of Classification Search
USPC .............. 60/496, 497, 502, 398; 290/53, 42; 441/1
See application file for complete search history.

(56) References Cited

U.S. PATENT DOCUMENTS

| | | | |
|---|---|---|---|
| 4,163,633 | A | 8/1979 | Vriend |
| 4,672,222 | A | 6/1987 | Ames |
| 5,808,368 | A | 9/1998 | Brown |
| 2006/0090463 | A1 | 5/2006 | Burns et al. |
| 2008/0229745 | A1 | 9/2008 | Ghouse |
| 2011/0006531 | A1 | 1/2011 | Ghouse |
| 2011/0304144 | A1* | 12/2011 | Dehlsen ............ E02B 9/08 290/53 |

FOREIGN PATENT DOCUMENTS

| | | |
|---|---|---|
| JP | H0347478 A | 2/1991 |
| JP | 3151572 A | 6/1991 |
| JP | 2009-503362 A | 1/2009 |
| RU | 2004837 C1 | 12/1993 |
| SU | 1129407 A1 | 12/1984 |
| WO | 8400583 A1 | 2/1984 |
| WO | 2006067421 A1 | 6/2006 |

OTHER PUBLICATIONS

Database WPI: Section PQ, Week 199414; Derwent Publications Ltd., London, GB; Class Q55, AN 1994-116500; XP002406517 "Wave Driven Power Generating Unit—Has Meshed Filter Placed on Conical Headpiece, and Anchor, and Flexible Sleeve Made of Separate Sections Connected to Each Other by Flanges".

MacMillin, David M., Ewbank's Hydraulics—Wirtz' Pump; Jun. 20, 1998, http://www.marcdatabase.com/~lemur/rbt-scoopwheel.html Mortimer, G.H., The Coil Pump—Theory and Practice; Journal of Hydraulic Research, vol. 22 1984, No. 1, pp. 9-22.

* cited by examiner

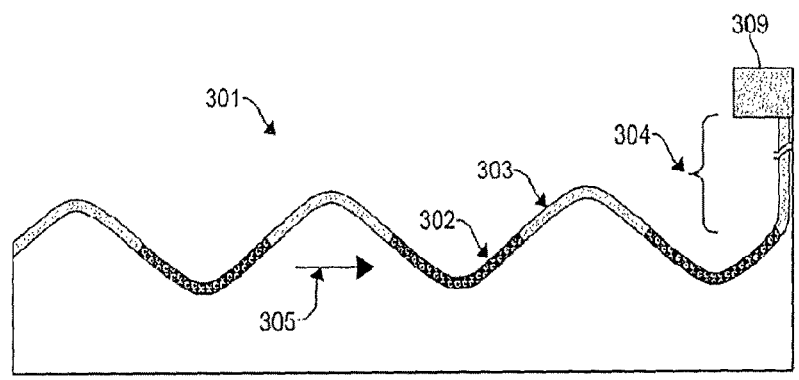
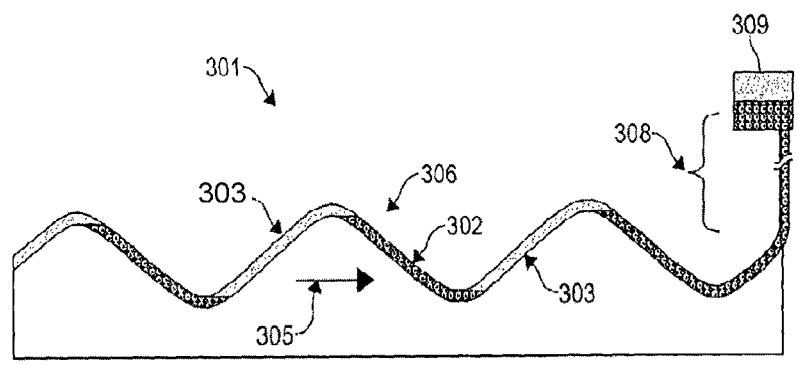
FIG. 3

FIG. 4 - SINGLE PIPE TYPE INLET

FIG. 5 - INLET VARIABLE BUOYANCY

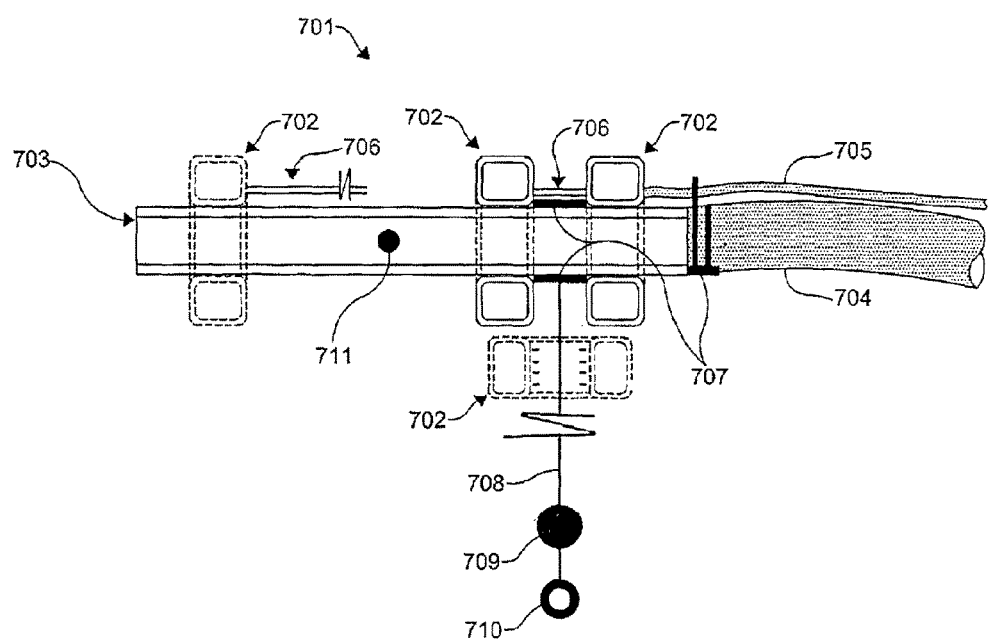
FIG. 7 INLET - INFLATABLE BUOYANCY TANK WITH CONTOL

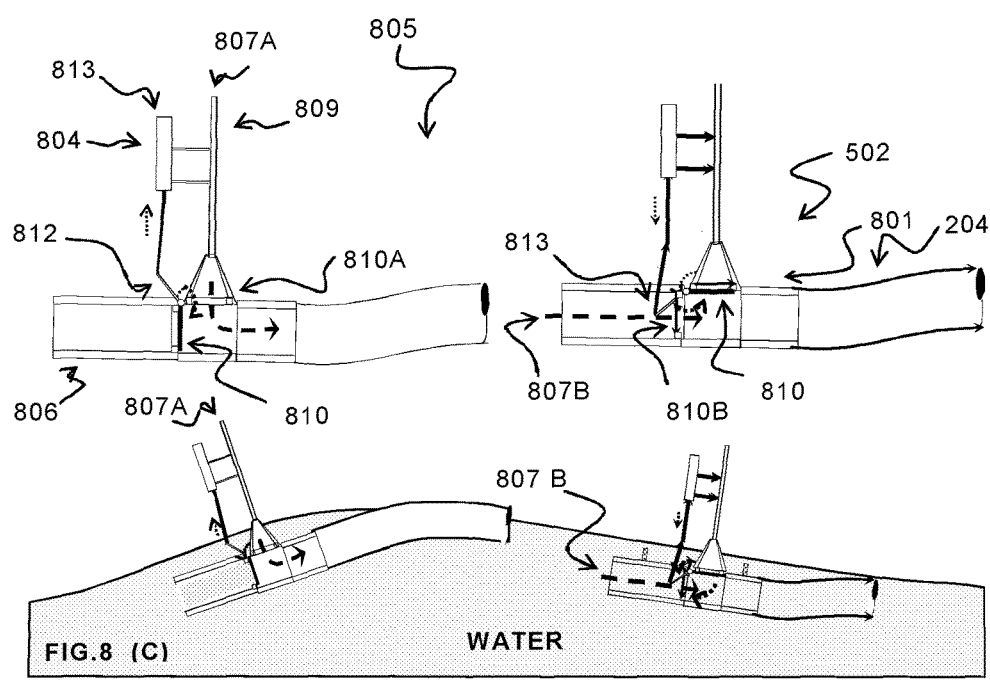

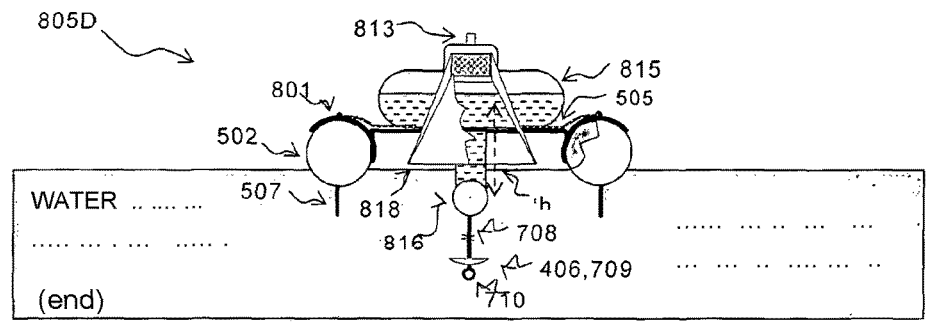
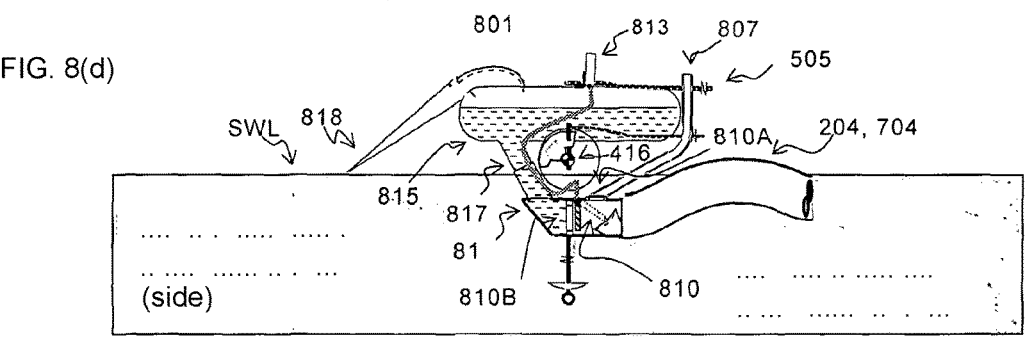
FIG. 8(d)
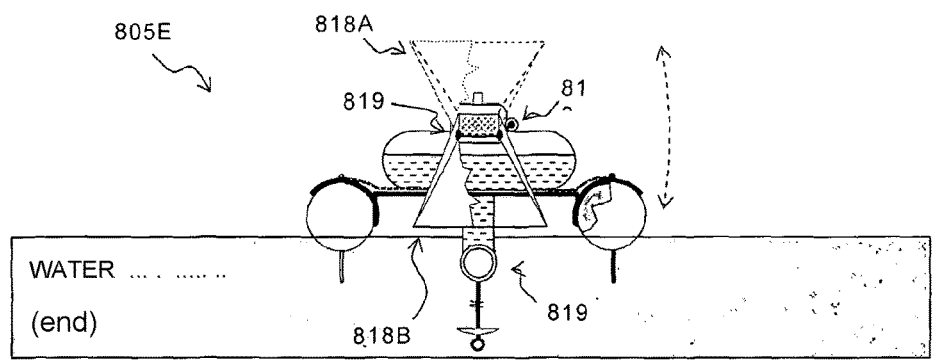
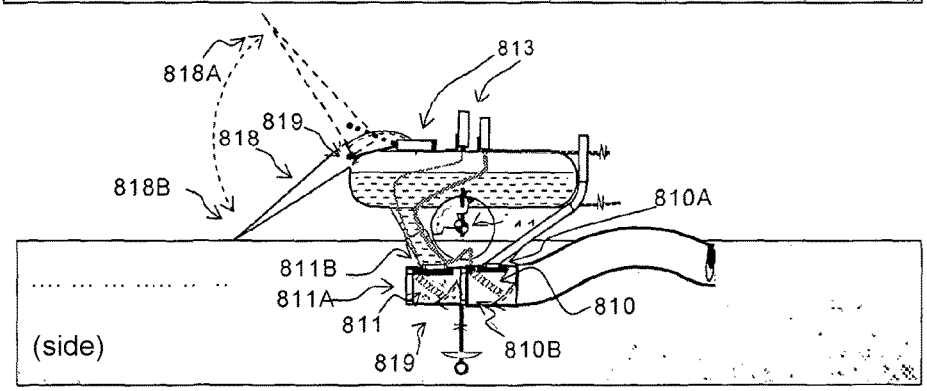
FIG. 8(e)

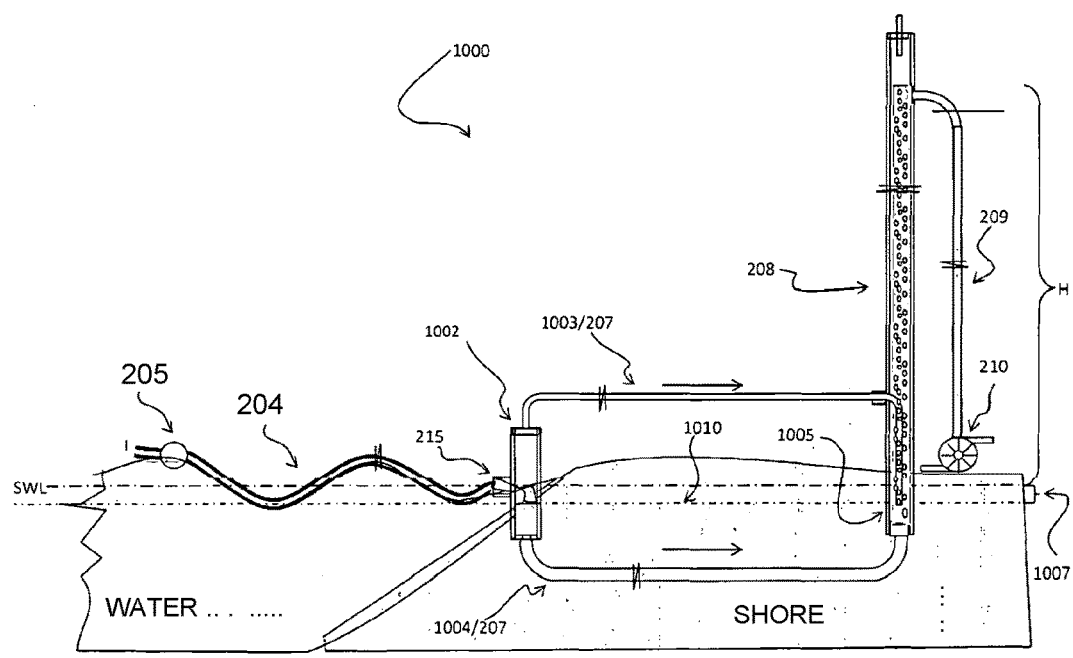
FIG. 10 "Air Water Separator"

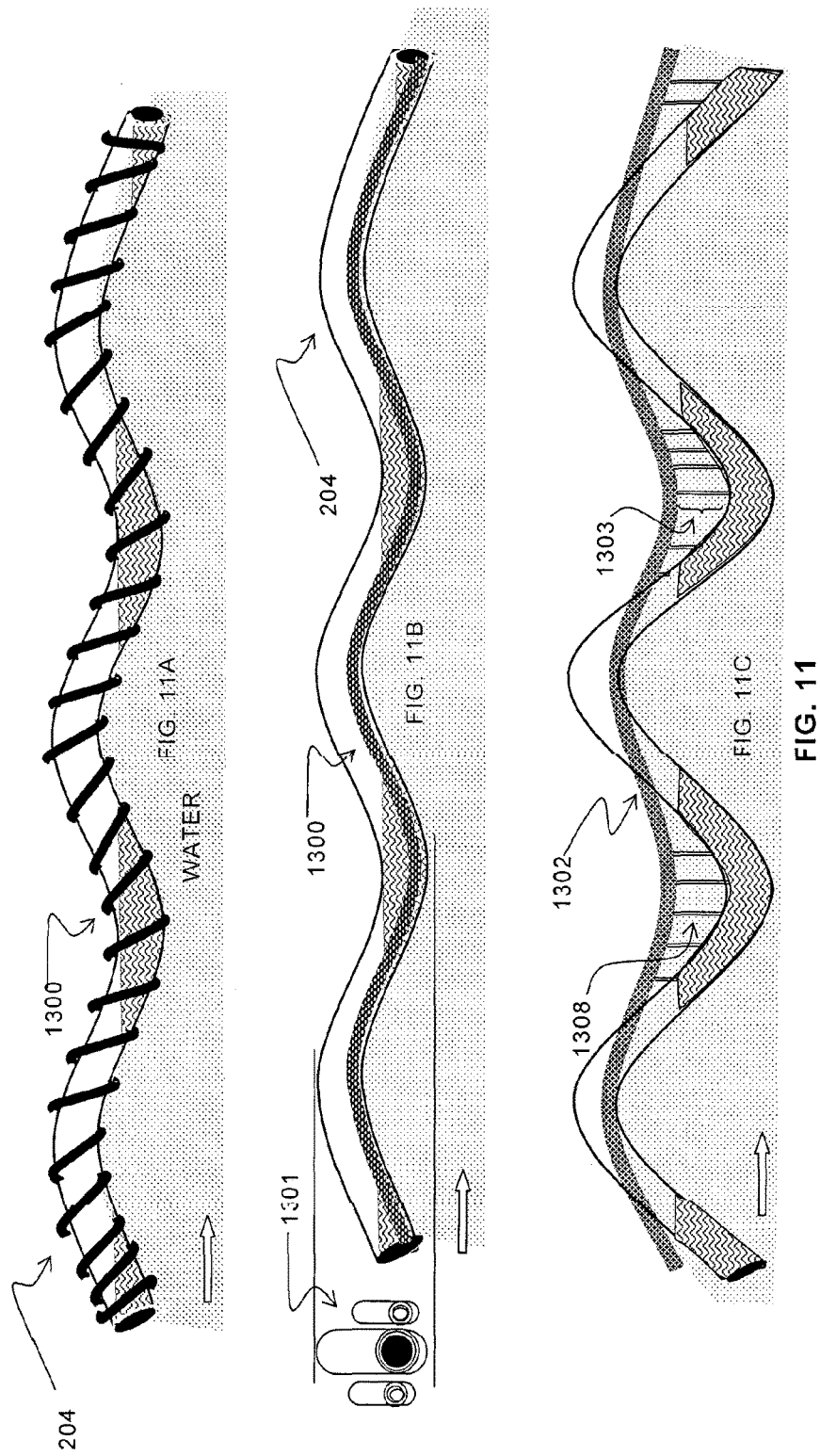

FREE FLOATING WAVE ENERGY CONVERTER WITH CONTROL DEVICES

FIELD OF THE INVENTION

The invention relates to an improved free floating wave energy converter. More particularly, the invention relates to an improved free floating wave energy converter "IFFWEC" relating to ocean wave energy converters (WEC).

BACKGROUND OF THE INVENTION

Free floating wave energy converters have been disclosed in applicant's earlier patent/patent application numbers AU2006274564 (A1), BRPI0614487 (A2), CA2617208 (A1), EP1915528 (A1), EP1915528 (B1), JP2009503362 (A), NO20081115 (A), NZ566247 (A), US2008229745 (A1), U.S. Pat. No. 7,823,380 (B2), US2011006531 (A1), WO2007015269 (A1) and ZA200801801 (A).

The original invention essentially comprises of a flexible pipe, or plurality thereof, that floats on the ocean surface and adapts to the wave form, suitably moored so as to maintain the fore and aft axis generally towards the waves direction. Special "Inlet", attached at the mouth of the flexible pipe, ingests graduated slugs/segments of air and water into the "Flexible Pipe", synchronous with the waves.

Fluid pressure is built up in the "Flexible Pipe" until it is sufficiently high to drive a turbine or pump ocean water into reservoirs, etc. Several such pipes could be grouped to make a wave energy farm. With the rest of the conditions remaining constant, increase in the number of "Flexible Pipes" and length, enhances the flow volume and pressure, respectively.

In US application 20100276933, wherein the principle of "overtopping" has been exploited to run turbines. A similar approach has been adopted for one of the devices disclosed herein, but to feed water to an "Inlet" system.

The principle of "Air Lift Pumps", with patents of more than 100 years vintage, has also been exploited in yet other sub-systems disclosed herein, but with certain differences. For instance, air pressure is being supplied from within the system in this case, and not fed from outside as in the case of the published material.

SUMMARY OF THE INVENTION

The present invention discloses several improvements made and some retrofit devices invented to overcome issues experienced and anticipated with the systems disclosed at original applications listed above. However, to provide continuity the original drawings, with the reference numbers, have been retained.

BRIEF DESCRIPTION OF THE DRAWINGS

FIG. 3 shows air and water "Slugs" in the "Flexible Pipe" during idling and pressure flow conditions;

FIG. 7 shows the "Inlet" with a plurality of inflatable buoyancy tanks and control;

FIG. 8(c) is a baffle type variation, FIG. 8(d) is version with a channeled ramp and FIG. 8(e) is version with a hinged channeled ramp;

FIG. 10 shows an Air-Water Separator;

FIGS. 11A-11C show various inflatable tubes associated with the flexible pipe.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Certain design principles to achieve the desired results are discussed in the succeeding paragraphs.

Figure 1:
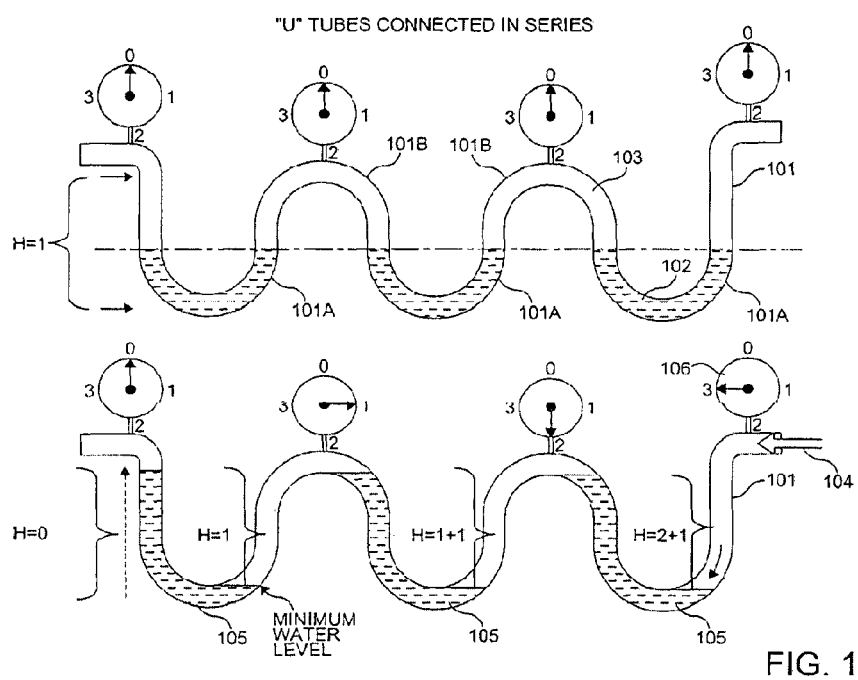
FIG. 1 depicts the principle of operation of the present invention.

FIG. 1 of the accompanying drawings illustrates the behavior of the air and water slugs in a flexible pipe arrangement. For ease of understanding, we have considered the waves to be regular curves, such as in the case of a "U tube manometer", connected in series 101. Let us also assume that, initially, water 102 is filled uniformly in all trough segments 101A of the pipe 101, with air 103 being trapped in crest segments 101B. It can be seen that, since all the segments 101A, 101B are connected in series, any force applied at any point on the pipe 101 will be transmitted throughout the length of the pipe. Thus, if some pneumatic pressure 104 is applied at one end of the pipe 101, it will "push" all the water segments/slugs up preceding crests 105 (against gravity). In other words, a pressure head will be created, which will be equal to the sum total of all the height displacements of the water segments.

Figure 2A:
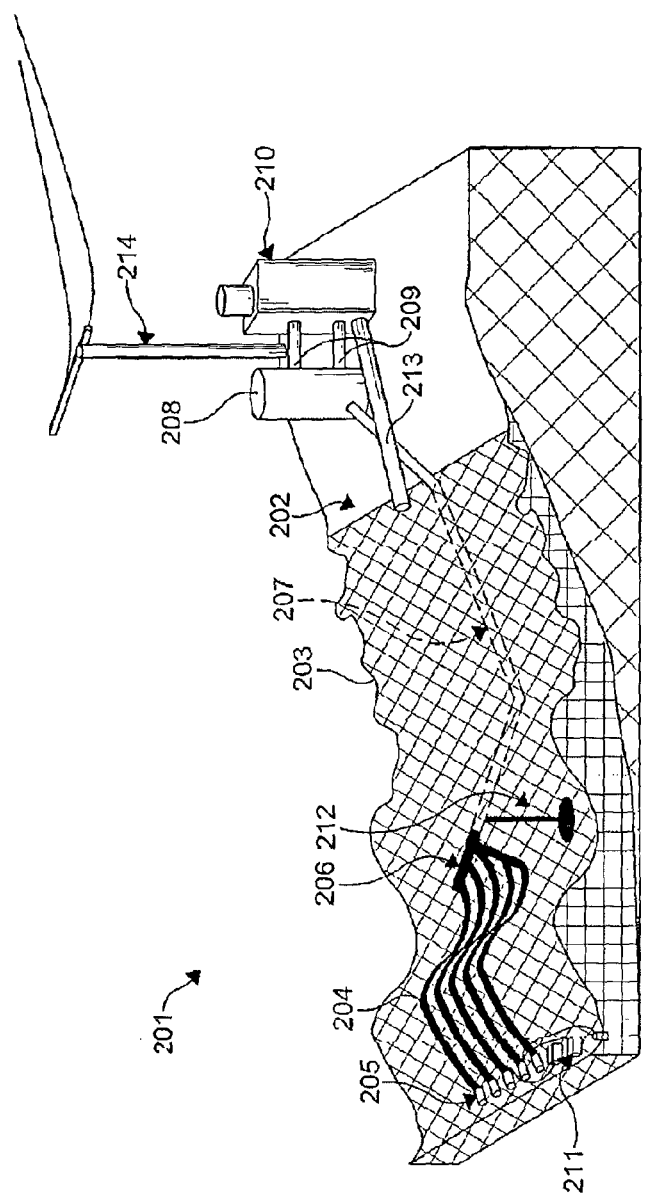
FIG. 2A is an artist's impression in perspective of the "Free Floating Wave Energy Converter" according to the invention.

FIG. 2A depicts an artist's impression of the FFWEC which describes an arrangement 201 depicting waves moving towards ashore 202, reflected waves near shore ("turbulence area") 203, and a plurality of "Flexible Pipes" 204 connected at one end to a plurality of "Inlets" 205, respectively, further connected at opposite ends to a "Manifold" 206 and the manifold 206, by means of a pipe 207 or plurality thereof, in fluid communication with the "Pressure Chamber" or "Pneumatic Accumulator" 208 or plurality thereof. The pressure chamber 208 is further connected by means of "Air and Water Piping" 209 to generators 210 or turbines. Moorings 211 are provided at the "Inlets" 205; supports 212 may be provided for the pipe 207. At least one drain pipe 213 is connected to the chamber 208; and a grid power supply 214 is connected to the generators 210.

Even though some of the systems above have been shown to be on shore, but could even be located offshore. Likewise, pneumatic pressure could also be developed by pneumatic compressors instead of the pressure chamber. It would also be possible to develop power directly from the fluid flow from the "outlet". The various pipes for fluid communication could also be in plurality. The aforesaid means and methods are preferred options and not the only possibilities.

Figure 2B:
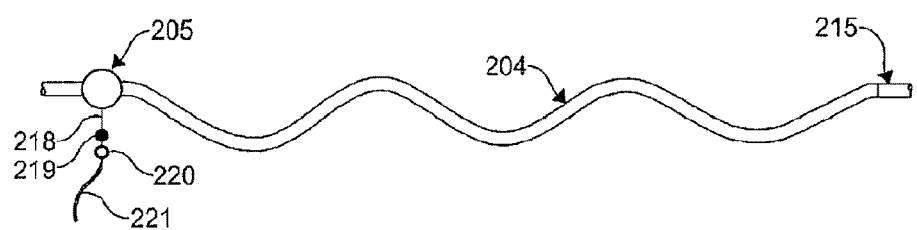
FIG. 2B depicts a preferred embodiment of the invention.

FIG. 2B is an enlarged view of the preferred embodiment of the invention essentially comprising the "Flexible Pipe" 204 connected at one end to the "Inlet" 205. An "Outlet" or coupling 215 is attached to an opposite end of the pipe 204 and is further connected to components shown in FIG. 2. A "Suspension Rod" 218 extends downwardly from the "Inlet" 205 and optionally includes a "Ballast/Damper" 219 and a mooring ring 220. A mooring line 221 is attached to the ring 220.

FIG. 3 of the present invention depicts a "Flexible Pipe" 301 floating on waves, with water 302 and air 303 "Slugs" in sustained flow. A water reservoir 309 connected to the outlet of the pipe 301 is located at an elevation towards the outlet side of the flow representing the extent of a pressure-head 304 on the flow, with the direction of wave motion being from left to right (arrow 305). With no back pressure (no water in the tank 309) the water "Slugs" 302 remain in the troughs of the pipe 301, and with water in the tank 309, the slugs 302 are pushed up the preceding wave crests 306 to generate an increased pressure-head 308 on the flow.

Figure 4:
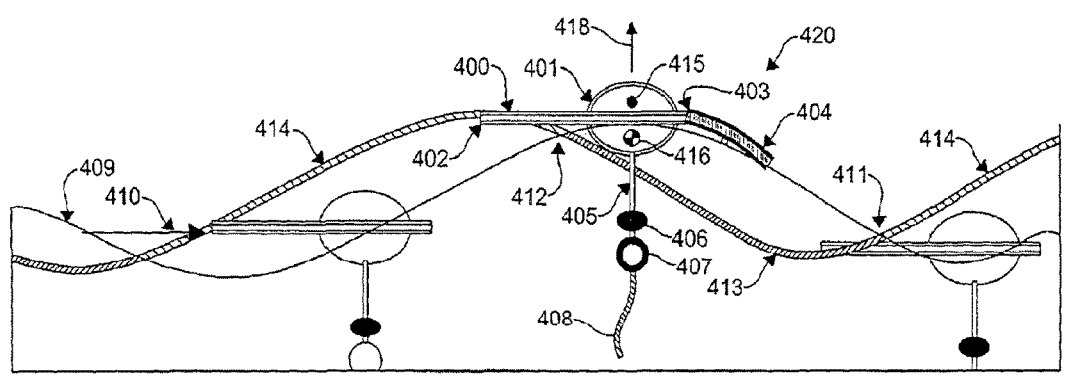
FIG. 4 shows a typical "Inlet" of the invention.

The basic embodiment in FIG. 4 shows an "Inlet" apparatus 420 comprising a single "Inflexible Pipe" 400, at least one buoyancy tank 401, which tank normally floats on the surface of a body of water represented by a wave 409. Through a mouth 402 of the pipe 400 both air and water can enter and an outlet 403 of the pipe is connected in fluid communication with a front end of a "Flexible Pipe" 404.

Further, the apparatus 420 additionally and generally consists of a "Suspension Rod" 405, either fixedly attached to the apparatus or hinged to it. In the former arrangement, the Suspension Rod 405 could have a "Ballast" and/or "Damper" 406 and a mooring ring 407 with an attached mooring line 408, all suspended below the apparatus, for providing and enhancing stability to the assembly, particularly in a vertical axis 418, that is to minimize the pitching motion of the assembly, while providing freedom to heave viz. along the vertical axis. These components if positioned below the buoyancy tank 401 minimizes the torque that would otherwise be created by the moment arm formed, due to the distance between a Center of Floatation "F" 415 and a center of gravity (CG) 416. Hence, both are kept aligned along the Vertical Axis 418 or nearest thereto.

Whereas, in the former case the "Inflexible Pipe", i.e. the fore and aft axis of the Inlet 400, has a freedom to pitch around the lateral axis and as well to heave. The "ballast" 406 also acts as a "damper", creating drag while moving up and down the waves. Thus, if it is located away from the Center of Floatation "F" 415, somewhere along the fore and aft axis of the Inlet, it would cause torque, thereby making the mouth 402 of the "Inflexible Pipe" 400 pitch up and down while riding the waves; which aspect is discussed subsequently herein below. It may be noted that, at the time of the "Zero Start" it would be necessary to push water into the mouth 402 of the "Inflexible Pipe" 400, at the required velocity and volume. Therefore, it would be necessary to have a relative motion between the horizontal component of the waves and the "Inflexible Pipe" 400. This does not happen if the "Inlet" 420 pitches along with the waves. The "Ballast" 406 enhances stability of the "Inlet" 420 in the vertical axis 415, thereby minimizing the pitching motion, as required in some embodiments of the present invention. The "Flexible Pipe" 404, which trails the apparatus 420, provides the directional stability. As such, it remains nearly in an upright position and rightly aligned as it floats up and down the waves.

The Inlet 420 generally faces the oncoming waves 409 (direction arrow 410) and is made to float at an appropriate distance from the (SWL) by adjusting the buoyancy of the buoyancy tank 401. Under operating conditions, it typically enters near a trough 411 and exists at a crest 412 of the waves 409 as they pass (for explaining the sequence, the wave 409 in the drawing is shown as stationary while the "Inlet" 420 is shown in three positions, moving from right to the left). When a wave 409 strikes the mouth 402 of the "Inflexible Pipe" 400, the water which enters it is separated from the main water body, while continuing to move through it at the same wave velocity. The "Water Phase" 414 commences from the trough of an oncoming "Air Phase" 413. Thus, the alternating intake of water and air "Slugs" is appropriately synchronized with the waves 409. The entry (crest 412) and exit (trough 411) points vary depending upon factors, such as the back-pressure at the "outlet" 215, wave conditions, the length of the "flexible pipe" 204, etc. and is suitably controlled.

The system could work without any controlling devices, under fair wave climatic conditions, with average efficiency and reliability. However, since the waves are not regular, provision for optimally controlling and regulating the air and water ingestion timing and volume have also been provided.

The intake volume and timing of air and water "Slugs" are controlled by altering the buoyancy and/or "up-down" tilting of the "Inlet" along its lateral axis. Buoyancy is increased or reduced by filling the buoyancy tanks with air or water, respectively. Alternatively, the Inlet 420 could also be pushed in and out of water by certain actuation means or with baffle arrangement. This enables ingestion of the "Slugs" according to the wave condition.

Inlets having means for controlling and regulating the buoyancy, whereby the air and water ingestion timing and volume could be controlled to a certain degree, besides making it possible to ingest only water to sink the apparatus/system in bad weather or ceasing operations by ingesting only air and totally float it, are described in detail below.

Figure 5:
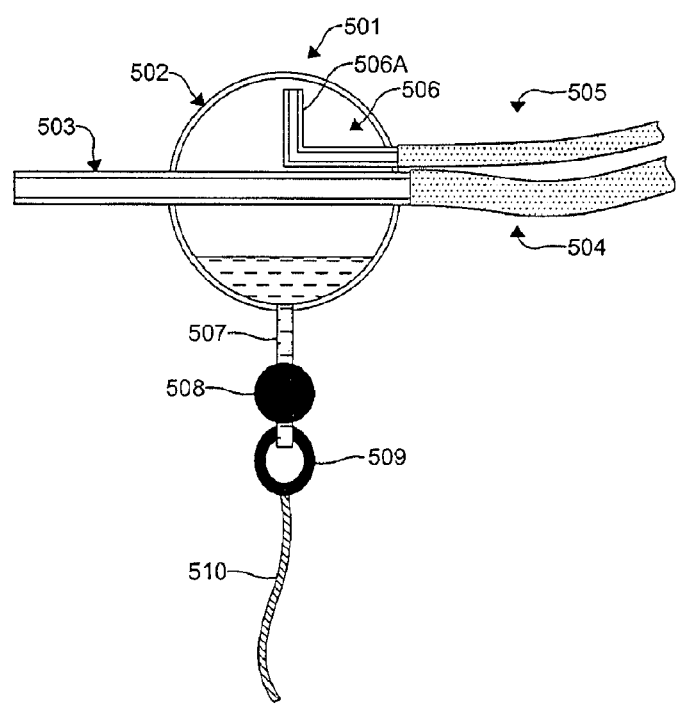
FIG. 5 shows the "Inlet" with buoyancy control.

FIG. 5 illustrates the above embodiment comprising an "Inlet" apparatus 501 with at least one "Buoyancy Tank" 502 having a "Pneumatic Duct" 506, a top end 506A of which opens in a top portion of the "Buoyancy Tank" 502. The duct 506 is connected through a hose 505 to the "Pressure Chamber" 208 (FIG. 2) with some control systems/devices 808 preferably located thereat, for varying the pneumatic pressure in the "Buoyancy Tank" 502. By varying the pneumatic pressure in the "Buoyancy Tank" 502, water is pushed in/out through a "Water Breathing Tube" 507, a top end of which is fixedly attached to the bottom of the "Buoyancy Tank" 502 and a lower end opening into the sea below, consequently varying the "Inlet" 501 buoyancy, thereby controlling the air and water intake timing and volume. The rest of the arrangements of this embodiment remain similar to those described in FIG. 4 above, including an "Inflexible Pipe" 503, connected to a "Flexible Pipe" 504, a "Ballast" 508 optionally attached to the tube 507, a mooring ring 509 attached at the bottom of the tube 507, and a mooring line 510 attached to the ring 509.

Figure 6:
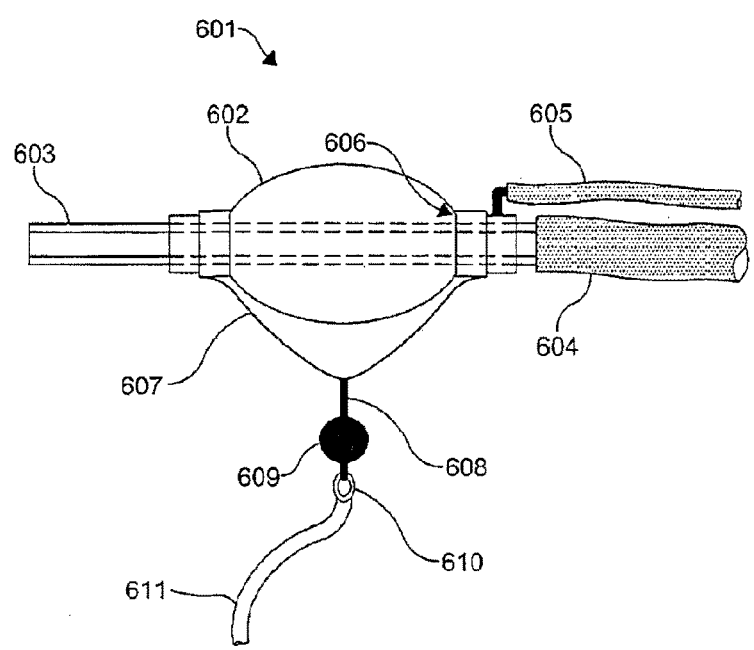
FIG. 6 shows the "inlet" with an inflatable buoyancy tank and control.

In another embodiment, an "Inlet" apparatus 601, which is illustrated by FIG. 6, includes at least one "Inflatable Buoyancy Tank" 602 which is directly connected with a pneumatic hose 605 as above, but without the "Pneumatic Duct" and "Water Breathing Tube" (the rest of the arrangements being similar to the previous embodiment described in the above paragraph). The hose 605 terminates at a duct 606 inside the tank 602. An "Inflexible Pipe" 603 is connected to a "Flexible Pipe" 604, a bracket 607 attaches a suspension rod 608 to the pipe 603, a "Ballast" 609 is provisionally attached to the rod 608, a mooring ring 610 is attached at a bottom end of the rod 608, and a mooring line 611 is attached to the ring 610.

As can be appreciated, the buoyancy of the "Inlet" apparatus 601 can be varied by inflating/deflating the "Inflatable Buoyancy Tank" 602. The inflatable variable buoyancy tank 602 could be, as shown in FIG. 6, a spherical shape or any other suitable shape and its principle operation also being similar in each case.

In yet another embodiment illustrated by FIG. 7, an "Inlet" apparatus 701 comprises at least two "Inflatable Buoyancy Tanks" 702, connected individually, in groups or jointly through respective hoses 705 and 706 with the "Pressure Chamber" 208, or pneumatic compressors, which may be shore based and having the pneumatic pressure and controls and switching devices generally installed thereat. The "Inflatable Buoyancy Tanks" 702 are suitably arranged on the "Inlet" apparatus 701, whereby the pitching, i.e. the angle of rotation around the lateral axis of the "Inlet" apparatus and its buoyancy, can be controlled by varying the buoyancy of the "Inflatable Buoyancy Tanks" 702 individually. Also shown are an "Inflexible Pipe" 703 connected to a "Flexible Pipe" 704, brackets 707 for attaching a "Suspension Rod" 708 and the pipe 704 to the pipe 703, a "Ballast" 709 attached to the rod 708, a mooring ring 710 attached to an end of the rod 708, and a "Center of Flotation" (F) 711. The tanks 702 encircle the pipe 703 and also can be positioned on the rod 708.

If the "Damper" 709 is located at a certain distance aft of the "Center of Floatation" (F) 711 (instead of vertically below it as described at FIG. 5 for instance, and the Suspension Rod 708 may be hinged to the apparatus so as to enable pitching, the drag caused by the "Ballast/Damper" 709 would create some torque, which would make the "Inlet" 701 tilt/pitch "up", with (F) as the fulcrum, while it rides up the waves, and vice versa. In this case, the water which would be in the "Inflexible Pipe" 703 during the "Water Phase" 414 (FIG. 4) would also be lifted up by the additional pitching motion of the "Inlet" 701, causing it to fill the empty "Flexible Pipe" 704 at "Zero Start". The angle of rotation of the "Inflexible Pipe" 703 can be varied by changing the buoyancy of the respective buoyancy tanks 702.

In another embodiment, at least two "Rigid Buoyancy Tanks", similar in construction to the "Buoyancy Tank" 502 explained at FIG. 5 above are used, instead of the Inflatable Buoyancy Tank 602 of FIG. 6. The arrangement of the components and their functions is similar to that explained in FIG. 7 above, including the "Inflexible Pipe, the "Flexible Pipe", the "Suspension Rod, the "Ballast" and the mooring ring.

FIG. 8(a) through FIG. 8(e) are the schematic representations of Hydro/Pneumatically Actuated Inlet systems 800 having certain alternative components and controls. The systems enable more precise, quicker and positive control of the air/water phases 411-412, as compared with the previous systems, whereat the "Inlet" apparatus 420 typically entered near a trough 411 and existed at a crest 412 of the waves as they passed. The means and method of controlling those operations have already been described at FIG. 5 to 7.

Whereas, in embodiment depicted at FIG. 8(a), an inlet 803 is sequentially lifted above 804A and pushed below 804B the water surface, with more precise timing. The higher pressure below water surface also helps in pushing water slugs into the inlet 803 and when it is lifted to a height, a "head" is also created, both factors help in forming distinct water slugs and also imparting velocity to them, particularly at the time of "Zero Start". The device could additionally have a tilting mechanism.

This system 800 includes a suspension means 801, depicted as an inverted "U" frame, at least one buoyancy tank 502 attached to pylons 801A on either side of the suspension means 801. The buoyancy tanks 502 having control features similar to those described at FIG. 5 through FIG. 7 and the relevant paragraphs above (not shown).

The inlet pipe 803, which may have shapes and dimensions different from the other inlet pipes 401, 501, 601, etc. disclosed herein, is attached to one end of a reciprocating mechanisms; for instance levers, guides, scissor jack or lift, that is operated by linear actuator, for instance bellow or cylinder, typically cylinder 804 as shown in FIG. 8, further attached to the "Flexible Pipe" 204, and its other end 804 to the horizontal beam 801B of the suspension means.

The inlet pipe 803 reciprocates along the vertical axis, by means of at least one linear actuator 804, between fully retracted (in air) 804A and fully extended (in water) 804B positions. The linear actuator 804 could be pneumatic or hydraulic system, driven by air, oil or even sea water.

Pneumatic pressure is provided through hoses 505 in fluid communication with the linear actuator 804 and a compressed air source (not shown), such as the pressure chamber 208. Alternatively, the fluid could even be hydraulic oil or sea water driven by external pump. The reciprocating and rotary motions of the inlet pipe 803 are triggered by suitable sensing and control system 808 with inputs from the phase of the wave at the inlet pipe 803, the back pressure at the "outlet" 215, length of the "Flexible Pipe" 204, wave conditions or wave climate, energy demand, etc.

Figure 8A:
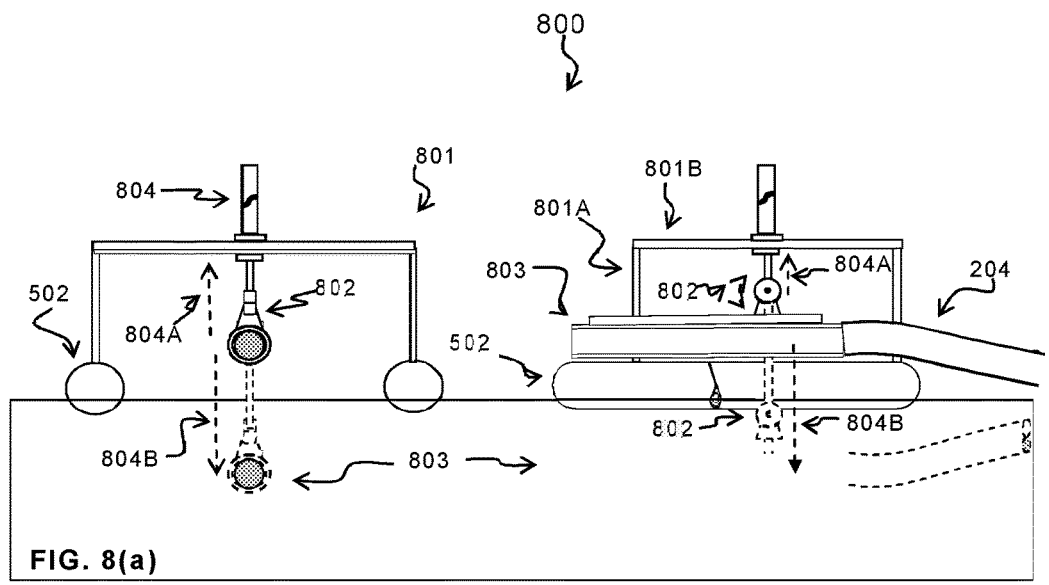
FIG. 8(a) shows a hydro/pneumatically actuated inlet of the invention in side view.
Figure 8B:
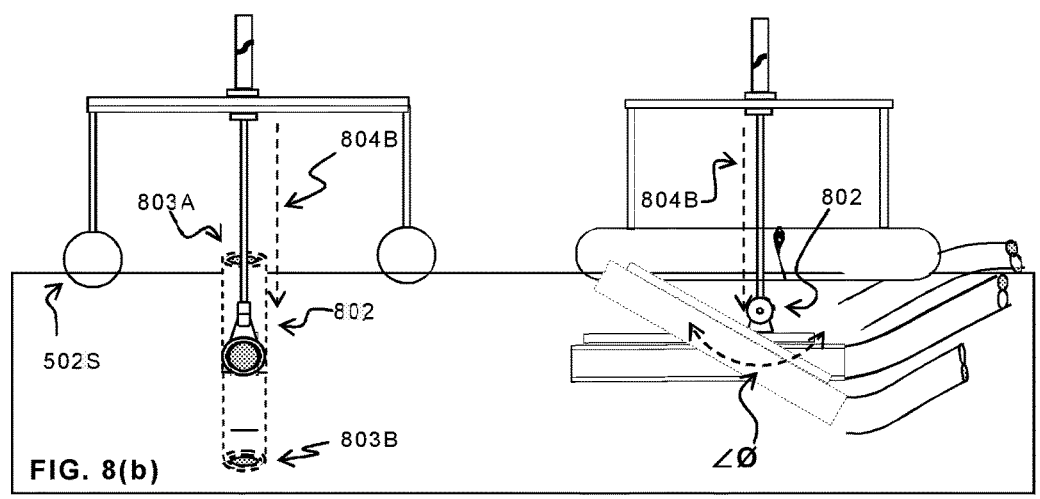
FIG. 8(b) is a front view.

FIG. 8(b) depicts a rotary actuator 802, mounted on inlet pipe 803, attached to the lower end of the actuator 804 and, enables rotation of the inlet pipe 803 through certain degrees around the lateral axis $\angle \emptyset$.

FIG. 8(c) depicts yet another version of the Hydro/Pneumatically Actuated Inlet 800. The "Baffle Type" Inlet 805 system has two inlet pipes; instead of a single Inlet 803 previously described in the present invention, one each for water 806 and air 809 ingestion, respectively. Air 807A and water 807B are alternately ingested through the respective pipes. A baffle 810 alternately closes either the air port 810A or water port 810B, while the opposite one automatically opens, thereby feeding the respective slugs into the flexible pipe 204. An actuation system 813, similar in construction to the cylinder actuator device 804, is employed to operate the baffle valve 810, through suitable UP/DOWN 812 linkage mechanism. The rest of the components remain similar to those described at FIGS. 8(a) and 8(b) above.

The main difference between the "Baffle Type" Inlet 805 system and the rest described in the present invention is that, the water 806 and air 809 ingestion pipes always remains under water and above water, respectively; as shown in the diagram with "WATER". In this embodiment, instead of pushing the Inlet 803 in and out of water, either air 807A or water 807B, slugs are ingested with the baffle opening and closing the respective ports. This arrangement requires comparatively lesser time and force to alternate the between the two phases, besides causing minimal disturbance to the water flow. However, it also entails more number of moving components.

While certain type of actuators 802, 804 have been mentioned, any other type of actuator could be used. The phase of a wave at the inlet pipe 803 could be sensed by any of the various suitable sensors available for measuring wave heights, time period, etc. (not shown). In most of the previous Inlet devices disclosed above, the phase velocity of a wave was being directly converted into flow of water slug. However, since the "water ingestion phase" 414 mostly commences near a trough 411, where the velocity in the direction of flow is not only low, but could even be out of phase by 180°. Hence, there was a possibility of water slugs not getting enough "push" or kinetic energy to suddenly accelerate to the phase velocity at the right moment, particularly at the time of the "zero start". To overcome this mismatch, it would be possible to first convert the kinetic energy at the crest of a wave into potential energy; by topping up water in a reservoir or tank located at a height, storing it there, and then reconverting it into kinetic energy—by accelerating a slug to the desired velocity, volume and wave phase, particularly at the time of "Zero Start". Some embodiments to enable the above sequence of operation are disclosed below.

FIG. 8 (d) discloses yet another embodiment of the Automatic Inlet (814) consisting a tank fed inlet 816, with a tank 815 suitably attached on top of the tank fed inlet 816 and 815 being in fluid communication with the tank fed inlet 816, through a telescopic pipe or flexible hose 817 of adjustable length. The tank fed inlet 816 is further in fluid communication with the flexible pipe 204, via baffle 810 that opens/closes either the air port 810A or water port 810B ports, wherein the tank fed inlet 816 functions as in the case of the "Baffle Type" Inlet 805 above.

A channeled ramp is 818 attached to the tank 815, such that its trailing edge is jointed in front and top of tank 815 and its front edge is near the SWL.

FIG. 8(e) is a version of the Inlet system disclosed at FIG. 8 (d), consisting an Inlet 819, with a tank 815 suitably attached on top and in fluid communication with the inlet 819, through a telescopic pipe or flexible hose 817 of adjustable length. The inlet 819 is further in fluid communication with the flexible pipe 204, via a first baffle 810 that opens/closes either the air port 810A or water port 810B.

The Inlet 819 further having a second baffle 811 located in front of the first baffle 810, wherein the second baffle 811 opens/closes either the ocean port 811A or tank port 811B, actuated by means of an actuating system 813. In the ocean port "Open" 811A/Tank "Closed" position, water from the ocean can flow through the tank fed inlet 816, via first baffle 810, further into the flexible pipe 204, as in the case of FIG. 8 (d), while the tank port 811B would remain "Closed", and vice versa.

When the ocean port 811A is "open"/tank port 811B "closed", the inlet 819 functions as Inlet 805, FIG. 8(c). Whereas, when tank port 811B "open"/ocean port 811A "closed", the inlet 819 functions as in the case of tank fed inlet 816, FIG. 8(d).

Further, a Channeled Ramp 818 is rotatably hinged 819 to the tank 815 and can be moved "UP" 818A/"DOWN" 818B by means of a similar actuating mechanism 813. It 818 is lowered till its front edge is near the SWL 818B to enable overtopping of the tank 815 by moving waves, generally at the time of "Zero Start" and lifted "Up" for continuous operation. Since the velocity of the water slug entering the Tank fed inlet 816 will be a function of the "head" 'h' of the water level in the tank 815 above the Tank fed inlet 816, the desired slug velocity can be achieved by adjusting the "head" 'h', which can either be set manually, based on the average celerity in the area of deployment, or automatically by a servo mechanism (not shown), according to the inputs from sensing 808 devices. However, the latter option would increase the sophistication, with consequent cost escalation, O&M problems, etc. Hence, the manual option is preferable, more so because the requirement of feeding water at some pressure and velocity would mostly at the time of "zero start" or kick-start.

The rest of the arrangements are generally similar to those described at FIG. 8 (a) through (d) above. The various structural components being generic in nature have not shown, to avoid clutter.

A "rod" and "ballast/damper" arrangement 406, 708, 709 and 710 described at FIG. 5 and FIG. 7 is optionally attached to tank fed inlet 816 in line with the Centre of Gravity "CG" 416. The ballast/damper 709 maintains the inlet system 805D aligned in vertical position, along the vertical axis, and as well dampens the heaving motion as it rides the waves. The rationale for this has already been covered at the description of FIGS. 5 and 7 above. Since the inlet system 805D resists following wave motion, waves roll up the ramp and fill the tank 815, where water is stored till let into the 816 by opening inlet port 810B.

It would also be possible to combine features of one embodiment with another. For instance, a larger diameter pipe or tank 815 could be attached at the front the tank fed inlet 816 of the inlet. When and lifted up and tilted backwards water would flow into the inlet 803 at the required velocity and timing. Baffles 810 would be precluded.

Another feature of the invention is a "Flat-Conical Intake" 900 (hereinafter termed as the "Intake" to distinguish it from the "Inlet" 205/420. It is a well-known fact that the larger pipe diameter the lesser the frictional loss, with the other factors remaining constant. Due to this reason, where on one hand small diameter pipes are not suitable due to their higher frictional loss at the wave velocities expected in the ocean, on the other the large diameter pipes are ineffective when the wave heights are comparatively smaller.

This is mainly because, in this case, (a) the mouth of the "Inlet" may not completely enter a trough 411 and exit at a crest 412, but remain partially in both, air and water most of the time. Thus, integrated water slugs may not form, precluding development of the liquid seals which are essential for building up pressure, and (b) the large diameter "Inlet" would take a longer time transiting through the air-water. During this period, both air and water would simultaneously enter the "Inlet" 420, creating a situation similar to the one described at the previous paragraph. The "Intake" is meant to resolve these problems.

Figure 9:
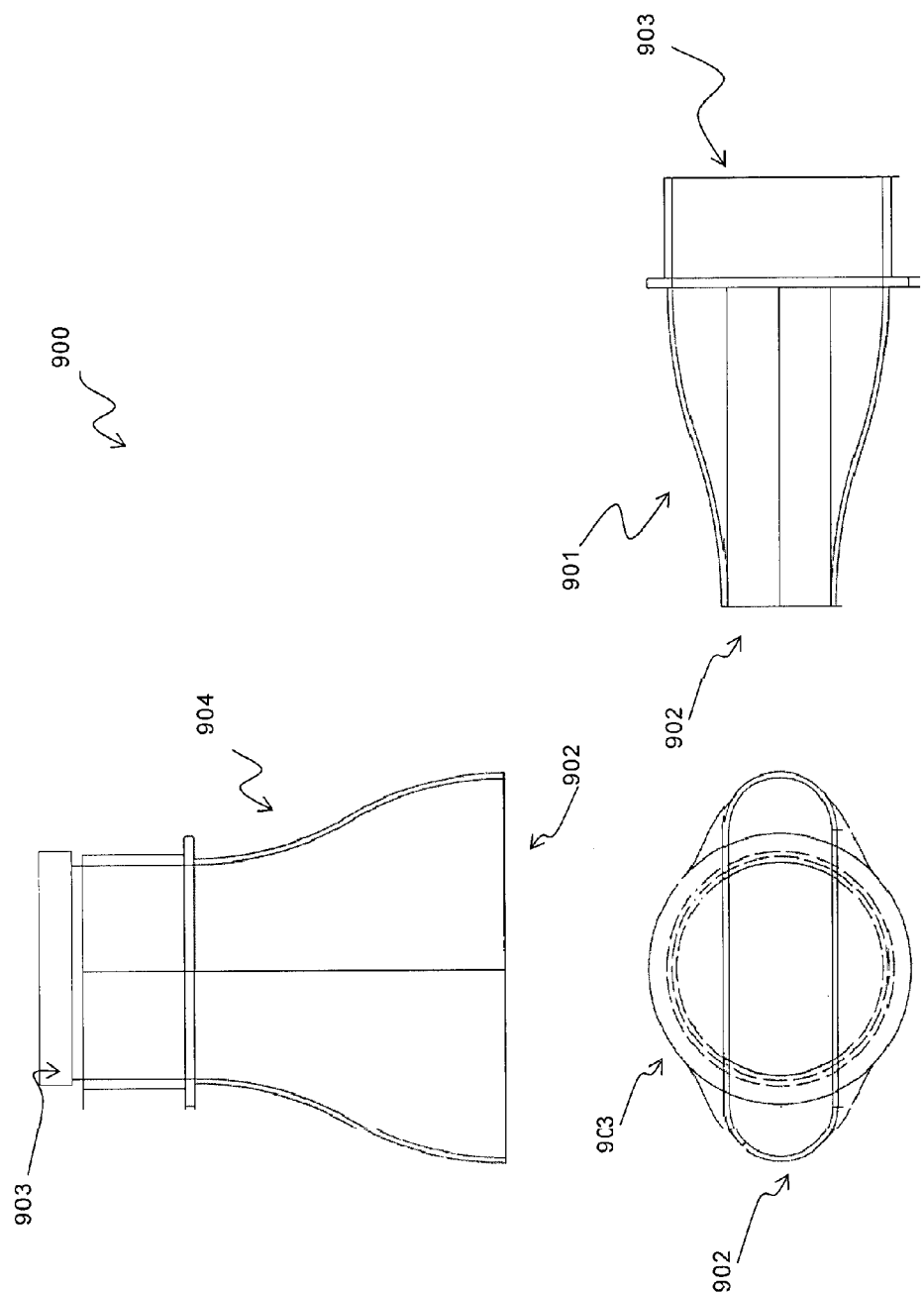
FIG. 9 shows a Flat-Conical Intake.

FIG. 9 depicts an "Intake" 900 consisting of a hollow conical body 901, a narrower mouth with rounded rectangular cross section 902 and a cylindrical outlet 903 to suit the flexible pipe 204. The cross sectional area of the "Intake" is maintained nearly constant all along its length and it smoothly blends from rounded rectangle to circular shape thereby providing better fluid dynamic characteristics. The Intake could either be attached directly to the "Flexible Pipe" 204, or mouth of the "Inlet" 205/420. The intake 900 assists in ingestion of water particularly in shallower wave climate.

An additional feature of the invention includes an "Air-water Separator" 1000. It may be possible to pump water up beyond a certain height in an arrangement which works on the principle of "U Tube Manometer", such as the present invention, notwithstanding the amount of pressure that may be applied or is being generated by the "flexible pipe".

Reference is made to FIG. 1. Now, if the pneumatic pressure 104 is increased, the "water slugs"101A, that are already at the "MINIMUM WATER LEVEL" 105 cannot be pushed up any further, but the "liquid seals" that were formed by the "water slugs" 101A, will be breached and the air 103 that was trapped in the "air slugs" 105 will bubble out through the "water slug" 105 at "Minimum Water Level". Some water from the "water slugs" 105 may also spill over into the adjacent trough segment. As a result of this, the pressure 106 will drop to some extent, and air will continue to escape as long as it is being pumped in.

Reference is also made to FIG. 3, "SLUGS UNDER PRESSURE". In this case too, if a "water slug" 302 happens to go below its "Minimum Level", the "liquid seal" would similarly be breached, consequently enabling the air pressure to escape. As the "air slugs" 303 get depleted, the buoyancy that was being provided by them would also decrease, resulting in sagging of the "Flexible Pipe" 204 between two adjacent "air slugs" 303, causing them to merge. Consequently, the "flexible pipe" 301 could sink. This phenomenon is more prominent in case the "head" 308 is more than the height of the "water slug" 306, and the pipe diameter is also large; for instance even 10 cm ID Whereas, it would be around a meter in diameter in the field conditions. As solution to this problem, the "Air-water Separator" 1000 is described below.

FIG. 10 depicts the "Air-water Separator" 1000, viz. an apparatus attached at the discharge side of the "Flexible Pipe" 204 or "Manifold" 206 or "Outlet" 215. Water and air from the "outlet" 215 are pumped under pressure into the Air-Water Separation Tank 1002 and get segregated in it, with air and water flowing upwards and downwards, respectively, due to gravity. The fluids are further conveyed to the Pressure Chamber 208 and/or turbines/generators 210, via the air 1003 and water 1004 pipes 209, respectively. The air pressure is pumped by means of the air hose 1003 and injected into the Pressure Chamber 208, through the "Air Discharge Nozzle" 1005, the mouth of which is located below the SWL, at a given depth and termed as the "Differential Pressure Depth" 1007.

The water level in the Air-Water Separation Tank 1002 is maintained at the "Differential Pressure Level" 1010, i.e. somewhere below the "outlet" 215, irrespective of the pressure head H. This is because; the Air Discharge Nozzle" 1005 is located at the "Differential Pressure Depth" 1007, viz. below the SWL. The pressure required to displace water from the Air Discharge Nozzle" 1005 also acts on the top surface of the Air-Water Separation Tank 1002, pushing the water in it down by an equal depth, i.e. to "Differential Pressure Level" 1010. The "Pressure Chamber 208" and Air-Water Separation Tank 1002 hold slugs and column of water, respectively, in equilibrium, making it a closed system.

The flow of water and air under pressure from the "Flexible Pipe" 204, via the Air-Water Separation Tank 1002, will build-up a pressure head "H" in the "Pressure Chamber 208, and get discharged through the Water Piping 209 to run the turbine 210. The air bubbles injected into the "Pressure Chamber" 208 will increase the volume of the fluids in it and as well assist in enhancing the upward flow of the fluids, consequently increasing the Pressure head "H". Thus, the pressure energy in the compressed air is also utilized.

The principle of the "Air Lift Water. Pump" or "Geyser Pump" is applied in the case of case, with the exception that, the water to be lifted and the pneumatic pressure, both, are supplied from the same source, i.e. the "flexible pipe". The air pressure/pneumatic is pumped back into the system, increasing the total efficiency or minimizing energy loss as well.

FIG. 11A shows a selectively inflatable and deflatable tube 1300 attached to the "Flexible Pipe" 204 along a length of the flexible pipe, wherein the tube is coiled around the flexible pipe. The inflatable tube 1300 is inflated at the time of "Zero Start" and deflated when the system is running in a stable condition. By this method sagging during startup could be precluded. The pressure in the inflatable tube 1300 could also be varied between inflated deflated to depending on the operating conditions. A source of pneumatic pressure supplies pressured air to the tube, wherein when the tube is inflated by the pressured air, a buoyancy of the flexible pipe is increased to prevent the flexible pipe from sagging or sinking in the body of water.

FIG. 11B shows pair of inflatable tubes 1300 externally and laterally attached on either side of the "Flexible Pipe" 204 along its length. On the left hand side of the drawing is a front view 1301 of the same.

The inflatable tubes 1300 are inflated at the time of "Zero Start" and deflated when the system is running in a stable condition. By this method sagging during startup could be precluded. The pressure in the inflatable tubes 1300 could also be varied between inflated deflated to depending on the operating conditions.

Pneumatic pressure can be supplied from the pressure chamber (208) or an external source and controlled by a controlling means.

FIG. 11C shows another embodiment which restrains the "Flexible Pipe" 204 from sinking beyond a preset depth/limit 1303. In this case an inflatable/deflatable tube 1302 is disposed vertically above the "Flexible Pipe" 204. The inflatable/deflatable tube 1302 is attached with the Flexible pipe 204 by means of tethers 1308, ropes or strands of the required length, for restraining the flexible pipe 204 from going below the depth/limit 1303 below the wave surface. For instance, if the length of the tethers 1303 is 1 m, the water segments will be restrained from going below this depth. Pressure in the inflatable/deflatable tube 1302 can be varied to extend the depth/limit 1303 to some extent.

Pneumatic pressure is supplied to the inflatable/deflatable tube 1300, 1302 from the "Pressure Chamber" 208 or any other external source. The pressure in the inflatable/deflatable tubes is controlled with control devices externality located.

In the above case too, the selected depths 1303 can be varied in steps as described above.

In another option for this embodiment, instead of the inflatable tube, inflatable/deflatable balloons are used.

Besides compressibility, the other significant factor that will affect the functioning of the FFWEC is the rise in temperature due to compression, per Charel's Law/Gas Law. However, it will mostly get absorbed by the water. Conversely, at the time of expansion in the "Pressure Chamber" 208 generators 210, the temperature will fall which could cause freezing, particularly when operating at low temperatures, such as in the higher latitudes. Besides loss of energy/heat, more energy would have to be spent in heating the fluids to prevent freezing. Therefore, to conserve energy the "Flexible Pipe" 204 is suitably insulated by wrapping it with thermal insulating material or providing built-in insulation.

For mooring it is preferable to use mooring buoys, since the weight of the mooring line would be taken up by the buoys and not act on the "Inlet" or system as such.

The orientation of the flexible pipes is of significance for energy extraction. Energy is progressively extracted by a "Flexible Pipe". Hence, if it is disposed directly along the wave direction, the maximum energy that it can absorb will be limited to the energy of the wave front acting on its cross section, i,e. area of the mouth of the pipe. Whereas, if it is laid at certain angle to the wave direction, energy would be progressively absorbed as a wave travels along the length of the pipe.

Various other permutations and combinations of the same principle of operation and arrangements are also possible, but not mentioned herein In accordance with the provisions of the patent statutes, the present invention has been described in what is considered to represent its preferred embodiment. However, it should be noted that the invention can be practiced otherwise than as specifically illustrated and described without departing from its spirit or scope.

I claim:

1. A control device for a free floating wave energy converter, the converter including an inlet system having an inlet pipe attached in fluid communication with an inlet end of a flexible pipe extending between the inlet end and an outlet end, the flexible pipe being moored facing angularly to a wave direction in a body of water, the control device comprising:
    a pair of buoyancy tanks;
    a suspension means supporting and attaching the buoyancy tanks on opposite sides of the inlet pipe: and
    an actuator mounted on the suspension means, wherein the actuator is operated to selectively control an entrance of alternating slugs of water and air into the inlet pipe and movement of the slugs through the flexible pipe.

2. The control device according to claim 1 wherein the actuator alternately pushes the inlet pipe below a surface of the body of water and lifts the inlet pipe above the surface of the body of water to control a timing of the slugs.

3. The control device according to claim 1 including a rotary actuator mounted on the actuator, the rotary actuator rotating the inlet pipe through a predetermined angle in a pitching axis for selectively controlling admission of water and air to the inlet pipe and feed the slugs into the flexible pipe at a desired velocity and timing.

4. The control device according to claim 1 wherein the inlet pipe has a water port positioned below the surface of the body of water, an air port in fluid communication with air above the surface of the body of water and a valve operated by the actuator for opening the water port and closing the air port to admit a slug of water from the body of water to the flexible pipe and for closing the water port and opening the air port to admit a slug of the air to the flexible pipe at a desired velocity and time.

5. The control device according to claim 4 including a tank mounted on the suspension means above the surface of the body of water for receiving water from waves in the body of water, wherein a channeled ramp is attached to the tank for directing over topping water from the waves into the tank, the tank being in fluid communication with the inlet pipe between the water port and the valve to conduct the water to the inlet pipe.

6. The control device according to claim 5 including an air breathing tube connected at one end to the air port and open to the air at an opposite end.

7. The control device according to claim 5 including another valve actuatable for opening the water port and preventing water from flowing into the inlet pipe from the tank, and for closing the water port and permitting water to flow from the tank to the inlet pipe.

8. The control device according to claim 5 including the channeled ramp rotatably attached to the tank for selective movement between a lowered position and an up position wherein there results directing over topping water from the waves into the tank in the lowered position and no over topping in the up position.

9. The control device according to claim 5 including a rod attached to and extending vertically below the inlet pipe in line with a center of gravity of the inlet system and a ballast/damper attached to the rod for maintaining the inlet system aligned in a vertical position and as well as dampening any heaving motion as the inlet system rides the waves, a mooring ring attached to the rod for mooring the inlet system, wherein resistance generated by the ballast/damper causes waves to roll up the ramp and fill the tank with the water, and wherein the water is stored in the tank at a potential energy level until released into the inlet pipe at a desired slug velocity.

10. The control device according to claim 1 wherein the inlet pipe has a hollow conical body with a rounded rectangular mouth and a cylindrical outlet, the outlet being connected to the inlet end of the flexible pipe.

11. The control device according to claim 1 further comprising:
    an air-water separation tank connected in fluid communication with the outlet of the flexible pipe and receiving the slugs of water and air;
    a pressure chamber connected to the separation tank by an air pipe to receive the air from the separation tank and connected to the separation tank by a water pipe to receive the water from the separation tank; and
    a turbine connected to the pressure chamber and driven by the water from the pressure chamber.

12. The control device according to claim 11 including an air discharge nozzle attached at an end of the air pipe inside the pressure chamber, wherein pneumatic pressure is discharged into the pressure chamber through the air discharge nozzle at a mouth located below a still water level of the body of water, wherein pressure required to displace a water column from inside the air discharge nozzle acts on a water level in the separation tank pushing the water level down to a differential pressure level, and wherein air bubbles in the pressure chamber increase a pressure head, and including a pipe connected in fluid communication between the pressure chamber and the turbine conveying water under pressure to drive the turbine.

13. The control device according to claim 1 further comprising:
    a selectively inflatable and deflatable tube attached to the flexible pipe along a length of the flexible pipe, wherein the tube is coiled around the flexible pipe; and
    a source of pneumatic pressure supplying pressured air to the tube, wherein when the tube is inflated by the pressured air, a buoyancy of the flexible pipe is increased to prevent the flexible pipe from sagging or sinking in the body of water.

14. The control device according to claim 1 further comprising:
    a pair of selectively inflatable and deflatable tubes attached to the flexible pipe on either side of the flexible pipe along a length of the flexible pipe; and
    a source of pneumatic pressure supplying pressured air to the tubes, wherein when the tubes are inflated by the pressured air, a buoyancy of the flexible pipe is increased to prevent the flexible pipe from sagging or sinking in the body of water.

15. The control device according to claim 1 further comprising:
    a selectively inflatable and deflatable tube disposed above the flexible pipe and attached to the flexible pipe by a plurality of tethers wherein the flexible pipe is suspended below the tube and the tethers limit a depth to which the flexible pipe can sink; and a source of pneumatic pressure supplying pressured air to the tube, wherein when the tube is inflated by the pressured air, a buoyancy of the flexible pipe is increased to prevent the flexible pipe from sagging or sinking in the body of water.

\* \* \* \* \*